US008545232B1

(12) United States Patent
Bardige et al.

(10) Patent No.: US 8,545,232 B1
(45) Date of Patent: Oct. 1, 2013

(54) COMPUTER-BASED STUDENT TESTING WITH DYNAMIC PROBLEM ASSIGNMENT

(75) Inventors: Arthur H. Bardige, Cambridge, MA (US); Lukas Biewald, Cambridge, MA (US)

(73) Assignee: Enablearning, Inc., Cambridge, MA (US)

( * ) Notice: Subject to any disclaimer, the term of this patent is extended or adjusted under 35 U.S.C. 154(b) by 1654 days.

(21) Appl. No.: 10/991,125

(22) Filed: Nov. 17, 2004

Related U.S. Application Data

(60) Provisional application No. 60/524,114, filed on Nov. 21, 2003.

(51) Int. Cl.
G09B 3/00 (2006.01)

(52) U.S. Cl.
USPC ............................ 434/322; 434/323; 434/350

(58) Field of Classification Search
USPC .................. 434/322, 323, 350, 353, 362, 365
See application file for complete search history.

(56) References Cited

U.S. PATENT DOCUMENTS

| | | | | |
|---|---|---|---|---|
| 5,059,127 | A * | 10/1991 | Lewis et al. ................... | 434/353 |
| 5,584,699 | A * | 12/1996 | Silver ............................ | 434/201 |
| 5,743,746 | A * | 4/1998 | Ho et al. ...................... | 434/332 |
| 5,842,869 | A * | 12/1998 | McGregor et al. ............ | 434/201 |
| 5,870,731 | A * | 2/1999 | Trif et al. ...................... | 706/52 |
| 5,885,087 | A * | 3/1999 | Thomas ........................ | 434/323 |
| 6,178,308 | B1 * | 1/2001 | Bobrow et al. ............... | 434/350 |
| 6,270,352 | B1 * | 8/2001 | Ditto ............................ | 434/118 |
| 6,684,053 | B2 * | 1/2004 | Helmick et al. ............. | 434/362 |
| 6,960,088 | B1 * | 11/2005 | Long ............................ | 434/322 |
| 2002/0087560 | A1 * | 7/2002 | Bardwell ...................... | 707/100 |
| 2002/0102522 | A1 * | 8/2002 | Sugimoto ..................... | 434/322 |
| 2002/0152187 | A1 * | 10/2002 | Chien ............................ | 706/60 |
| 2002/0196270 | A1 * | 12/2002 | Sirhall .......................... | 345/733 |
| 2003/0017442 | A1 * | 1/2003 | Tudor et al. .................. | 434/322 |
| 2003/0027112 | A1 * | 2/2003 | Warneke et al. ............. | 434/167 |
| 2003/0129576 | A1 * | 7/2003 | Wood et al. .................. | 434/362 |
| 2003/0134261 | A1 * | 7/2003 | Jennen et al. ................ | 434/354 |
| 2003/0182289 | A1 * | 9/2003 | Anderson et al. ............ | 707/10 |
| 2003/0198931 | A1 * | 10/2003 | Stuppy ......................... | 434/322 |
| 2004/0043364 | A1 * | 3/2004 | Wasowicz .................... | 434/167 |
| 2004/0126745 | A1 * | 7/2004 | Bell et al. ..................... | 434/201 |
| 2004/0219497 | A1 * | 11/2004 | Wen et al. .................... | 434/167 |
| 2004/0219504 | A1 * | 11/2004 | Hattie .......................... | 434/353 |
| 2005/0196730 | A1 * | 9/2005 | Kellman ...................... | 434/118 |

* cited by examiner

*Primary Examiner* — Bruk Gebremichael
(74) *Attorney, Agent, or Firm* — Houston & Associates, LLP

(57) ABSTRACT

The system automatically personalizes the assignment of problems to students in learning situations to enable every student to learn as efficiently and effectively as possible. Students are continuously tracked on their individual learning curve so that both they and their teachers can immediately see their progress and growth, and assess their need for additional support or instruction. Further, the system can immediately grade each exercise and provide instant feedback to both students and teachers without burdening the teacher with the grading of homework. Still further, the system incorporates a teacher settable mastery level control and a student learning efficiency meter that returns the "locus of control" over learning back to the student to enhance their concentration and motivate effective, efficient learning by enabling them to do just the number of problems that it takes to reach mastery of the topic or lesson. The system does this with problems from any source and for any discipline at every age level. It further links student assignments to other content either provided by the system or linked to the system to support instruction in the classroom, in labs, or on-line.

22 Claims, 13 Drawing Sheets

Copyright 2002-2004,
Enablearning, Inc.

Copyright 2002-2004, Enablearning, Inc.

Copyright 2002-2004,
Enablearning, Inc.

Copyright 2002-2004,
Enablearning, Inc.

Copyright 2002-2004,
Enablearning, Inc.

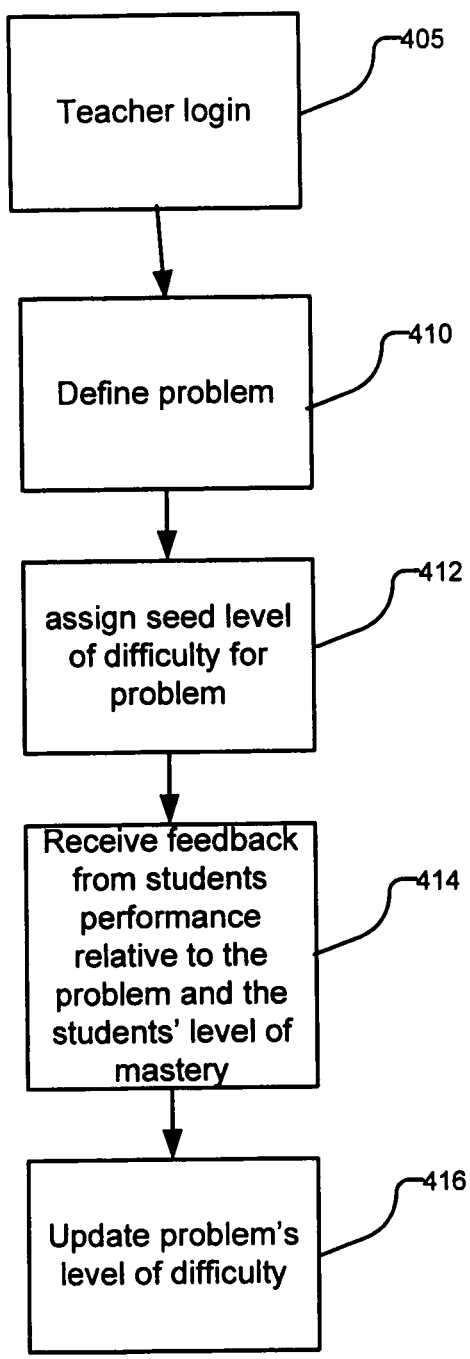
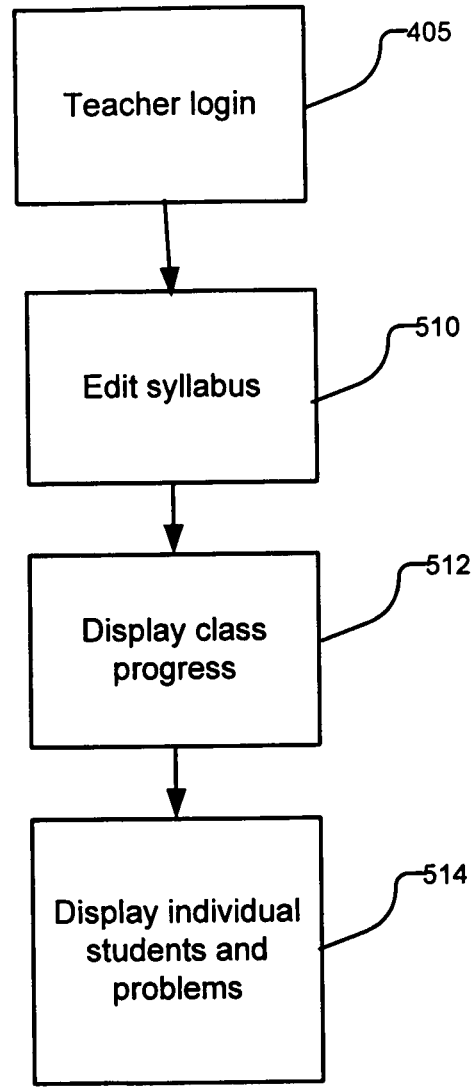
Fig. 4
Fig. 5

COMPUTER-BASED STUDENT TESTING WITH DYNAMIC PROBLEM ASSIGNMENT

RELATED APPLICATIONS

This application claims priority to U.S. Provisional Application No. 60/524,114, filed Nov. 21, 2003, which is incorporated herein by reference in its entirety.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Student assignments, generically called "classwork" or "homework", represent for most teachers and students the bulk of their work. When students do their homework they are learning to use and understand the concepts that are being taught. It is a widely held belief among educators that homework is the key to success for nearly all students. However, in the vast majority of the cases, the assignments are the same for every student in the class and are typically focused on the average student in the class. This "standardized" assignment process has three inherent problems.

First, it treats every student in the class in the same way and does not differentiate between students. Some are doing above average work and already know how to do the homework problems and will be wasting their time doing the assignment and are likely bored by it. Others are doing below average work and do not understand the problems they are supposed to do, and they are often frustrated by the assignment. The students who are left will find the assignment "just right", and they will actually learn from doing the "homework". Because assignments are not treated adaptively and individually, education is often very inefficient and often the majority of students may well find the homework irrelevant and frustrating.

Second, assignments are given during class periods and typically done as evening homework. The homework will then be handed in the next day and will not be returned to the student until the following day, under optimal conditions. This long feedback loop between lesson presentation, assignment, actual student work, grading the work, returning the work to the student, the student going over the work and finally asking and receiving necessary help can take a week or longer meaning that the assignment will likely fail in its primary mission to help students learn from each assignment in order to progress to the next one. This can be the case even for those students who are at the right level.

Third, every student does the same number of problems without regard to their learning or understanding. This takes the locus of control away from the student. It does not matter if the student is concentrating or not, if the student is really trying to learn or not, if the student already knows the subject or not. The student gets the same number of problems to do. In short, students are required to do a fixed set of problems irrespective of what they need and thus have no ability to control their learning. Assignments are thus not related to real learning or a concept of mastery, but instead are deemed "busy work". It is thus common practice for students to postpone "real learning" until they have to study for a test.

Previous attempts to address these problems using computer technology have used pre-testing to adapt assignments to student abilities. Such pre-tests are used by the computer to define the concepts a student needs to work on. Typically such concepts represent many homework assignments and not individual problems, because pre-tests represent a substantial amount of time and effort and can be applied to only large scale adaptations of content.

The other method that has previously been tried applied a "branching" methodology or tree structures to select problems for students to do based on their previous answers. Such "tree structures" require problems that have been previously classified by difficulty and by type such that the problem itself has "intelligence" with branches for each possible answer coded into the problem script. This method is often used for placement tests and educational software that claims to be "artificially intelligent". The method has the inherent weakness that the problems used must have their difficulty level previously established by some method, and thus only problems that have been statistically validated can be used. It further requires that the educators who construct the trees look at all of the possible student responses and provide pre-determined paths through the content. While this process may work for tests, it is far too difficult to be used successfully for 10,000 or more problems typically used in a semester long high school or college course in mathematics and other subjects. It is also severely limited in the types of problems that can be presented, requiring the pre-building of complete sequences or tree structures of concepts and problems that each student traversed in their own individual way based on their answers to problems.

SUMMARY OF THE INVENTION

In part, it is the need for an adaptive, mastery-based student homework system and the inherent problems in previous attempts to make homework adaptive for which the present invention was developed.

Critical to the homework process is the requirement that students have a positive learning experience. If a student has too much trouble because the problems are too difficult, if a student can not get the help they need to do an assignment on a timely basis, if the student does not get appropriate feedback so that she or he knows that they have done the problem correctly, if the student does not see that he or she is making progress, and finally, if the student is not rewarded for concentrating and for thinking, then the homework has lost a portion of its value and learning is inefficient or ineffective.

The present invention concerns a system that enables computer/web-based adaptive, individualized homework assignments to be given in any subject area with ordinary questions provided by publishers, teachers, or even students. It is designed to make learning much more efficient, provide the relevant feedback to both teachers and students to ensure effective learning, make learning student-centered, i.e. under student control, and to be able to do all of this economically in any subject.

The system continuously can track the learning or progress level of each student, the difficulty level of each problem, the learning efficiency of each student, and the quality (reliability) of each problem and continuously adjust and display all of these measures to make assignments adaptive. It thus does not require "intelligent" problems, but rather provides an intelligent system for ordinary problems. In addition, it provides dynamic visual feedback to both students and teachers for rapid and effective instructional intervention, and links each problem to appropriate content, based on the teacher's own syllabus, to enable students to learn anytime, anywhere.

Problems: The system handles problems of all types including multiple choice and production (fill in the blank). Problems can come from any source, including the classroom teacher, book, or student. And, problems can be presented on the screen with text, graphics, equations in full standard symbolic form as well as graphs, animations, and even simulations. Typically, each problem's level of difficulty is initially seeded by the author of the problem, and is then continuously and automatically updated by the system, reflecting real-student experience. This "real" difficulty level of a problem is displayed to both teachers and students; it is approximately matched to the student progress level to provide just the right problem to the student for optimal learning and growth.

Student Progress: Student progress for each assignment is continuously, visually tracked to provide feedback to the student and to the teacher. Learning, whether to ride a bike or taking the derivative, has long been recognized as a process, a growth that can be tracked on a learning curve. Here, the student's progress is measured as a position on a learning curve. In a typical lesson, a student will show proficiency with more and more difficult problems as they move up that learning curve. The present system matches the difficulty level of the problem and the student's position on their own individual learning progress curve. Students complete their assignment when they reach the mastery level (a settable parameter that can be teacher defined). Thus the invention assures that each student will reach the level of learning effectiveness sought by the teacher for every assignment. The present system allows student progress to be individualized and enables teachers to effectively tutor each student without the burden of defining and grading individual assignments. The system also includes a variety of automatic feedback mechanisms for both student and teacher to limit failure and frustration, such as providing messages to a student if he or she get a number of problems wrong in a row, providing feedback to teachers for those students who are having the most difficulty both on screen and by email, and providing linked concept and example content and appropriate precursor content for students to use as necessary.

Learning Efficiency: Since the invention seeks to bring all students to mastery; differentiating students, grading students, or diagnosing learning difficulties requires a new kind of measure, "learning efficiency". Learning efficiency monitors student success rates and visually shows the percentage of problems that the student has done correctly. It provides both students and teachers with an important measure of the student's productivity, because the higher the learning efficiency the fewer problems a student will need to do to reach mastery and the faster the learning can occur. Learning efficiency is continuously calculated and displayed for each individual student and serves as a significant motivation for students to focus and concentrate on their work. The more a student concentrates and uses structural resources or outside help, the fewer problems they have to do and the more quickly they will learn.

In practice, the present system features a computer-based education system that includes a software "engine" or program on the students' machine that connects to a program and database at a server. The system includes: a problem library that stores problems, corresponding difficulty levels and a variety of other data on the problems including usage, quality, and author. The system also includes data on each individual student and the student's usage, which includes student performance on every problem, student learning progress, efficiency, date and time stamp, and other relevant data.

When the student logs on, the program on the student machine, after being authenticated by username and password, goes to their syllabus for a new assignment. The user machine program communicates with the server program and the database and retrieves the relevant information on the assignment including the lesson, the learning level of the student, and the work already done. The user engine then requests problems at a certain level from the server, which then retrieves a set of problems from the problem database, picks one at random and sends it to the client machine.

The random choice of problems is an important aspect of the technology, enabling students to move through a problem set as efficiently and rapidly as possible. Without randomness, the student will move continuously from one level of problem to another incrementally. The invention's random functionality means that a student may get a significantly more difficult problem that can jump the student to a new level on one hand, while alleviating boredom and predictability, other the other hand. The degree of randomness is a settable parameter in the program that can be tuned based on reviews of student progress and success to accelerate or decelerate student progress toward mastery.

When a student solves and submits the answer to the problem, the program instantly grades it and updates the user screen graphically with the result. The system also allows a student to contest an answer. Contesting the answer gives the teacher the ability check the problem and solution and to give that student individual credit for that problem. It helps the teacher find problems that may have the wrong answer or that produce misconceptions, and it provides a mechanism for students to submit novel or creative answers to problems.

An assignment server serves the problems to students based on progress levels for the students and difficulty levels of the problems. Further, the server updates the difficulty levels of the problems and the progress levels of the students in response to answers to the problems that were supplied by the students.

Problems may be of a wide variety including: multiple choice, production (fill in the blank), etc. and in the preferred embodiment, the problems are presented by the graphical modeling system, as described in U.S. Pat. No. 6,918,768, issued on Jul. 19, 2005 The teachings of this application are incorporated herein by this reference, in their entirety. Such a system does not limit the problem developers to a particular mode, but can be used for graphical problems, visual problems, or even problems in which a particular graphical object or item moves.

In the preferred embodiment, new problems can be added to the problem library either by a publisher or teacher using the built-in problem generator, can be created one at a time inside the program, or imported from other sources as "text" or extensible markup language (.xml) files. The present system is not limited to these modes of problem input and can be set up to take problems from any computerized source, however. Preferably, when added, they have assigned or seed difficulty levels. These difficulty levels are then updated, based on the answers to the problems that are supplied by the students. In this way, the present invention can accept problems from almost any source. The problems need only be placed in appropriate folders in the database and possibly have seed levels of difficulty assigned. The system then redefines the problem's level of difficulty based on student performance on that problem and will, with student use, refine the difficulty levels for the most valid pairing with student progress for the best adaptive assignment.

After grading and recording the student's answer, the system updates the student's progress in the database and on screen for both the student and teacher to see. It updates the student efficiency graph, and it provides another problem to the student at just the right level to maximize growth. The student at any point may refer to content linked to the problem assignment by the teacher in the syllabus. The content may be a dynamic visualization of a concept, it may be a step-by-step example, it may be a link to text, animation, video, or other types of content learning objects. The degree to which the student's progress increases or decreases are based on the difficulty level of the problem. The student progress algorithm increases or decreases progress based on the problem difficulty level and student's progress, and other parameters that are adjustable to provide a positively reinforced homework experience for students. For example, in most cases the student progress for correct answers is greater than that for incorrect answers so that students do not see themselves as not able to succeed. When the mastery level is reached, the student has completed the assignment and may go on to another assignment or may do additional problems in the completed assignment at any time for additional practice.

The present system allows the student to log into a particular assignment at any time and from any computer connected to a network or the Internet to do additional problems, complete the assignment, or see the work that they have completed. The student has access to all of the visual records of the assignments that he or she has done. The teacher has access to all of the assignments of his or her classes and a visual record of each student.

In general according to one aspect, the invention features a computer-based education system, which comprises a problem library that stores problems and corresponding difficulty levels, a student list that stores progress levels of students, and an assignment server that provides the problems to the students based on the progress levels for the students and the difficulty levels of the problems. The system updates the difficulty levels of the problems and progress levels of the students in response to answers to the problems that are supplied by the students.

In general according to another aspect, the invention features a computer-based teaching method, which comprises providing problems to students from a problem library based on progress levels for the students and difficulty levels of the problems, receiving answers from the students to the problems, and updating the difficulty levels of the problems and the progress levels of the students in response to the answers to the problems.

In general according to still another aspect, the invention features a user interface for a computer-based homework system. The interface displays progress levels students for completed problems and difficulty levels of the problems.

In another case, the interface displays successive problems that are assigned to the student in one pane and problem success information including progress levels through an assignment in another pane.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 4 is a flow diagram illustrating the process of updating the problem library based on student results; and FIG. 5 is a flow diagram illustrating the process for teacher access to the system.

DETAILED DESCRIPTION OF THE PREFERRED EMBODIMENTS

Figure 1A:
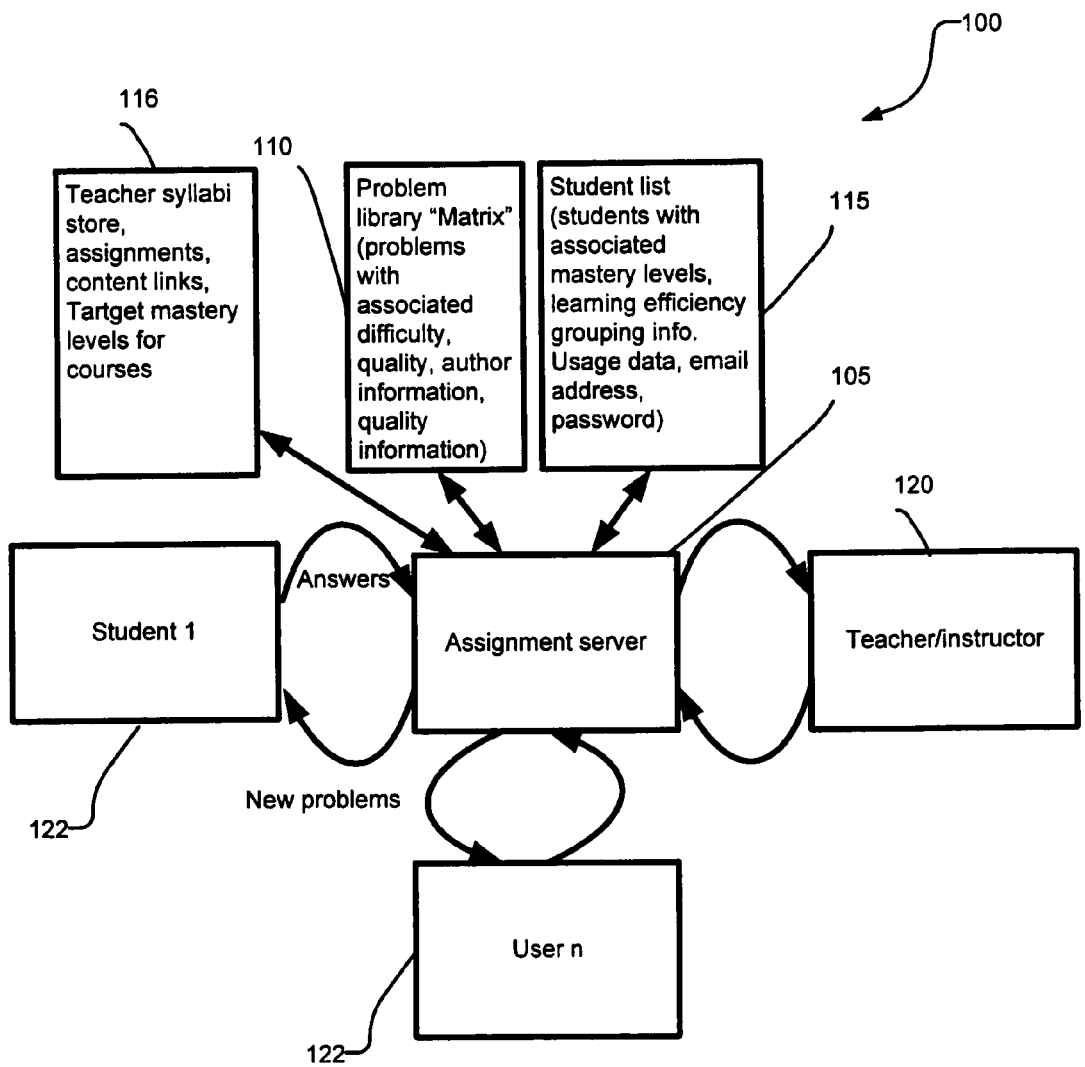
FIGS. 1A and 1B are system and process, respectively, block diagrams of the computer-based student testing with dynamic problem assignment system according to the present invention.

FIG. 1 shows a computer-based educational system, which has been constructed according to the principles of the present invention.

Generally, the system 100 comprises a problem library 110. This library 110 is typically implemented in a storage device of a computer or server system. In larger systems, a network storage disk array is used.

The problem library 110 stores problems and typically graphical information associated with the presentation of the problems to the students. In the preferred embodiment, the problems are stored in a format that is compatible with the Faraday system described in incorporated U.S. Pat. No. 6,918,768, issued on Jul. 19, 2005.

Further, in association with each problem, there is a corresponding difficulty level and quality measure.

The difficulty level is an assessment of the problem's difficulty. It is a value between 0 and 1 in one embodiment and represents an assignable probability that a student at that same level of progress will get this problem correct.

The problem quality is a measure of how well a problem differentiates between students at different progress levels. Students whose progress levels are below the level of difficulty of the problem should get the problem wrong more often than students whose progress levels are above the level of difficulty of the problem. The problem quality is based on how well student success in answering the problem correlates to the associated student progress levels.

In one implementation, the problem library 110 is used as a commonly accessible publishing mechanism or storage location. Homework or problem content authors, such as teachers, instructors, or professional authors, store new problems into the problem library. This makes the problems accessible to other teachers and instructors, who can then incorporate the problems into lesson plans, syllabi or tests issued to students.

Further, the problem library 110 also preferably stores additional information for each problem such as usage data and author.

The student list 115 typically holds login and registration information for the students that are using the computer-based educational system 100. This information includes, typically, students' name, the students' course grade, and the students' particular grades on past assignments, email addresses, and phone numbers, for example. The student list also holds group information for each student. This information links the student to a particular instructor or teacher and instruction group for that teacher.

The student list database 115 also includes data on each individual student's use such as student performance on every problem, efficiency, date and time stamp, the student's answer to the problem, the student's progress on the assignment of each problem, and other relevant data.

According to the present invention, the student list 115 further includes a progress level for each student. This progress level indicates how, based upon the student's performance using the computer-based education system 100 in a given subject matter, the student has progressed toward mastery in lessons in that subject. Typically, the student list holds different progress levels for assignments in different lessons and for different subjects or courses for each student. Preferably the student list also holds measures of the students' learning efficiency and students' answers to specific problems.

Each student's learning efficiency is based on the ratio of problems the student has gotten right to the total number of problems the student has tried, in one embodiment. It is one measure of a student's performance, and since all students theoretically achieve mastery in every lesson, it is sometimes used for assigning grades to students for particular lessons or courses because it differentiates student performance. The student learning efficiency is calculated for each student based on their performance in an assignment.

The teacher syllabi store 116 holds the assignments for each of the teachers and the respective courses that they teach. For each teacher and each class, there is a syllabus that is a collection of pointers to problems in the problem library 110. These pointers represent problems that the teacher wishes to assign the students as homework or tests. Further content links are also preferably provided. These links are typically defined by the teacher as pointers or hyperlinks to material that is stored outside the system, such as on the World Wide Web (WWW) or Internet. Such syllabi in the current embodiment of the system are configurable by each teacher to match their desired course sequence and schedule.

Also for each teacher/class combination, there is a specified mastery level stored in the syllabi store 116. This corresponds to the mastery level that will correspond to mastery for the given class. In some cases, the mastery level might be set at a high level of mastery, such as learning to fly a plane or preparing to take an advanced placement (AP) course. In other cases, relatively lower levels of mastery can be established. We expect that a typical math class's assignments will have mastery levels around 80% indicating that the student had reached mastery as the student reaches an expected 80% success rate in his or her problem solving across all of the ranges of difficulty. We expect that such success rates are typical because of an anticipated error rate when doing mathematical calculations especially in homework assignments. But, teachers may want students to achieve higher mastery levels as, for example, they prepare for a scholastic aptitude test (SAT) or advanced placement (AP) exam, and we thus allow mastery levels for each assignment to be a settable parameter by the instructor or the publisher. The mastery level is stored with the corresponding syllabus or class in store 116.

Other parameters include the range difficulty of the problems in the database from which a single problem is randomly given to the student. That is, the problem students are given is chosen from a group of problems across a range of difficulty levels. Then one of those problems is chosen at random to be done by the student. Thus, an assigned problem may not correspond directly to the student's progress level. Instead, some problems are more difficult and some are easier. In the preferred embodiment, the range of problem difficulty is a settable parameter. It can be used to control how rapidly students are able to progress through the problem set to mastery. It is set based on student data to assure that students have done enough problems to assure that they have learned the subject effectively and as efficiently as possible.

Another parameter is the rate of student progress toward mastery—how much a student moves when they get the problem correct (which is based on this rate function as well as on the difficulty level of the problem and the difference between the problem difficulty level and the student progress level.). A related parameter is how much a student moves back down the progress level for each wrong answer. These rate parameters are settable to provide positive experience for the learning process.

Still another parameter is the overall difficulty level of assigned problems relative to the progress level of the students. Game theory would suggest that students should have a 50% probably of getting the typical assigned problem correct based on the problem's difficulty level and the students progress level. Experience, however, as shown that probabilities of greater than 70% and preferably around 80% tend to make the learning experience more enjoyable or acceptable to the students. In short, if the assigned problems are too hard, students can become frustrated. Thus, the difficulty level should be such that students will get a majority, preferably about 80%, of the problems correct.

An assignment server 105 functions to interface with the users, student 1-student N (122) and the teachers or instructors 120. For students, the assignment server 105 accesses the problem library 110 to serve new problems to the student users 122 based on the course syllabi stored in the syllabi store 116. As described previously, the problems are provided in a format that is compatible with the Faraday educational system, in one embodiment.

The problems are provided to the student users 122 and typically client computers that are operated by each student. In a current embodiment the student computers 112 are executing a client/student applet process that connects with the assignment server 105. The students or users 122 then provide answers to the problems, which the student applet communicates back to the assignment server 105. The assignment server 105 then uses the answers provided by the students as a basis for updating the progress level of the student for the corresponding student records in the student list 115.

Generally, a student's correct answer increases the progress level of the corresponding student and a wrong answer would tend to decrease the progress level. The amount of increase or decrease in the progress levels are a function of several parameters including the student's current progress level, the level of difficulty of the problem, the number of problems a student has tried, the number of problems a student has answered correctly, for example. The system allows the adjustment of one or more of these parameters to achieve optimum rates of progress in different disciplines, groups, and grade levels. The answers are further used to update the learning efficiency measure for the associated student. Again, correct answers to the problems positively impact the student's efficiency measure.

Further, according to the preferred embodiment, the degree to which the student's progress level is changed by the correct answer to a given problem is also affected by the level of difficulty associated with that problem. Specifically, hard problems with higher levels of difficulty, when answered correctly by the student, tend to have a larger positive effect on the student's progress level than problems with lower levels of difficulty. On the other hand, when problems with relatively low levels of difficulty are answered incorrectly by the students, these tend to detrimentally impact the student's progress level to a greater degree as compared with when the students incorrectly answer problems with higher levels of difficulty.

In this way, the student list 115 is updated, and specifically the student's progress levels, not only based upon whether the student answers the problems correctly or not, but also the corresponding difficulty level of those problems.

The assignment server 105 further updates the problem library in response to the student answers. Specifically, the assignment server updates the problems' difficulty levels based on whether the student users answer the problems correctly. Here again, the degree to which the assignment server 105 updates the difficulty levels in the problem library 110 is determined in part by the progress level of the student that answered the problems. For example, if a student with a low progress level answers a problem correctly, which has a relatively high difficulty level, then the assignment server 105 will tend to reduce that problem's difficulty level by a larger measure than if the student who answered the problem correctly, had a higher progress level.

Thus, the assignment server 105 updates the problem library 110 and the difficulty levels of the problems based not only on whether or not the students answered the problems correctly, but also the progress levels of the students that answered the problems correctly, or not.

According to the preferred embodiment, the assignment server 105 is also accessed by the teacher or instructor via a client computer executing a teacher applet 120. This allows the teacher or instructor to, for example, add new problems or edit problems in the problem library 110. Further, the teacher or instructor is also provided with access to student information in the student list 115. Moreover, the instructor can track the students in the student list 115 based on their progress level and the number of problems the students have attempted in the assignments, and the teacher or instructor 120 can further monitor the efficiency with which the students in the student list 115 are learning.

Figure 1B:
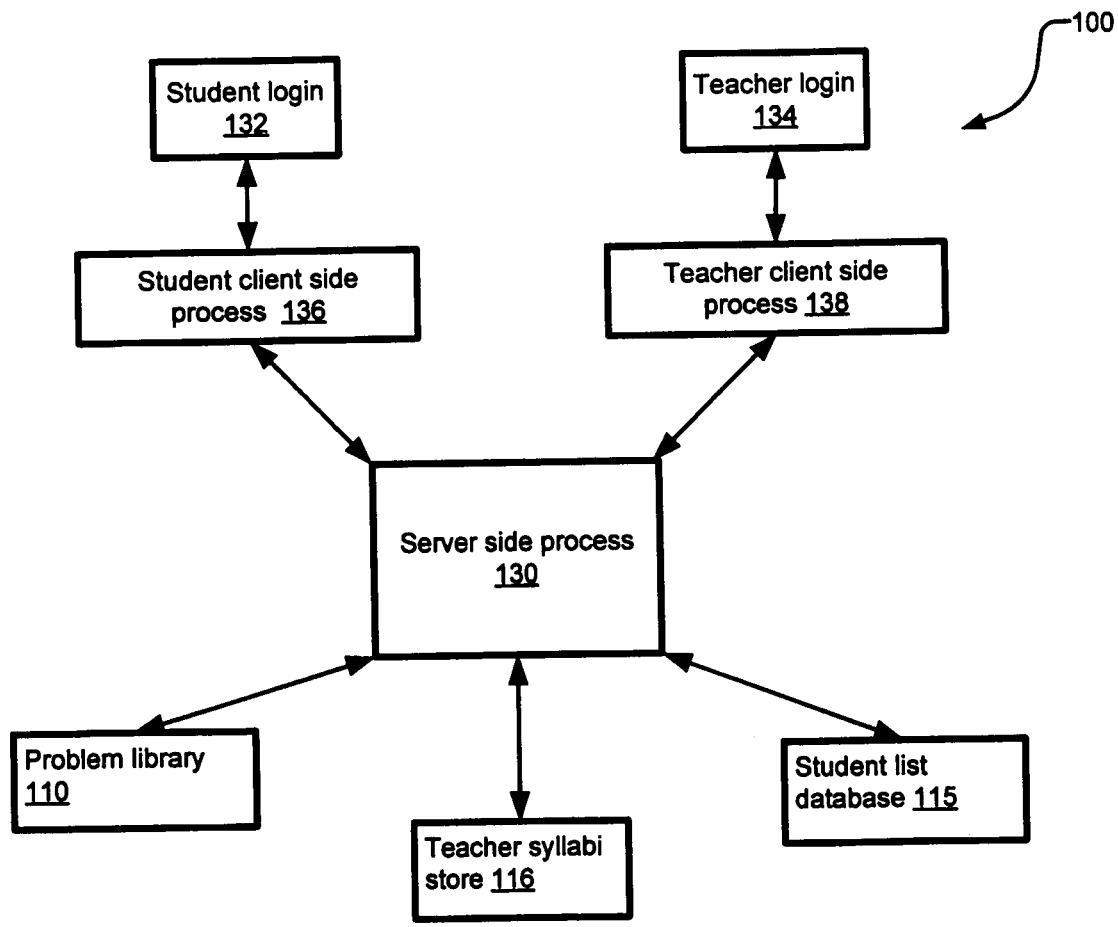

FIG. 1B illustrates the process architecture of the system 100.

A server side process running 130 on the assignment server 105 manages student logins 132 for students and teacher logins 134 for the teachers or instructors.

Generally, after login, the student is presented with access to relevant syllabi for the student's classes and assignments for those classes by a student side process 136, which is usually running on the student's client computer. This information is obtained from the student list database 115. The student side process 136 typically provides progress charts to the student indicating the student's progress level and usage data. The student is also provided with read-only access to the class syllabi for the classes in which the student is enrolled.

In contrast, after login 134, the teacher is presented with access to all information contained in the student list database 115 for that teacher's classes by a teacher client side process 138, which is typically running on the teacher's client computer. This information is obtained from the student list database 115 by first accessing a database listing the teacher's students and then obtaining information for each of the students from the student list database 115. Progress charts that provided by the teacher client process 138 preferably indicate the progress levels and usage data for all of the teacher's students.

In operation, the student selects an assignment from a class syllabus from the syllabi store 116 and then works through the material, including answering any problems. As described previously, problems are identified with reference to the structure of the course's syllabus, while the actual content of the problems is obtained from the problem library 110. The student list database 115 is updated with student progress. Additional information such as the time required by the student to answer each problem is tracked in some implementations to enable monitoring of student workload and speed.

In contrast, the teacher is provided with author level access to the problem library 110, by the teacher side process 138. This enables the modification or authoring of new problems to be stored into the problem library 110. The teacher also has rights to select the problems that he or she wants to remove from the assignment because they were not covered in the lecture or are not relevant to the lesson being taught. The teacher is further provided with editing rights for the syllabi for the teacher's classes.

FIGS. 2A-2I illustrate the graphical user interface of the inventive system and specifically how the assignment server 105 presents information to the students, student 1 through student N (122), and the teacher 120.

Figure 2A:
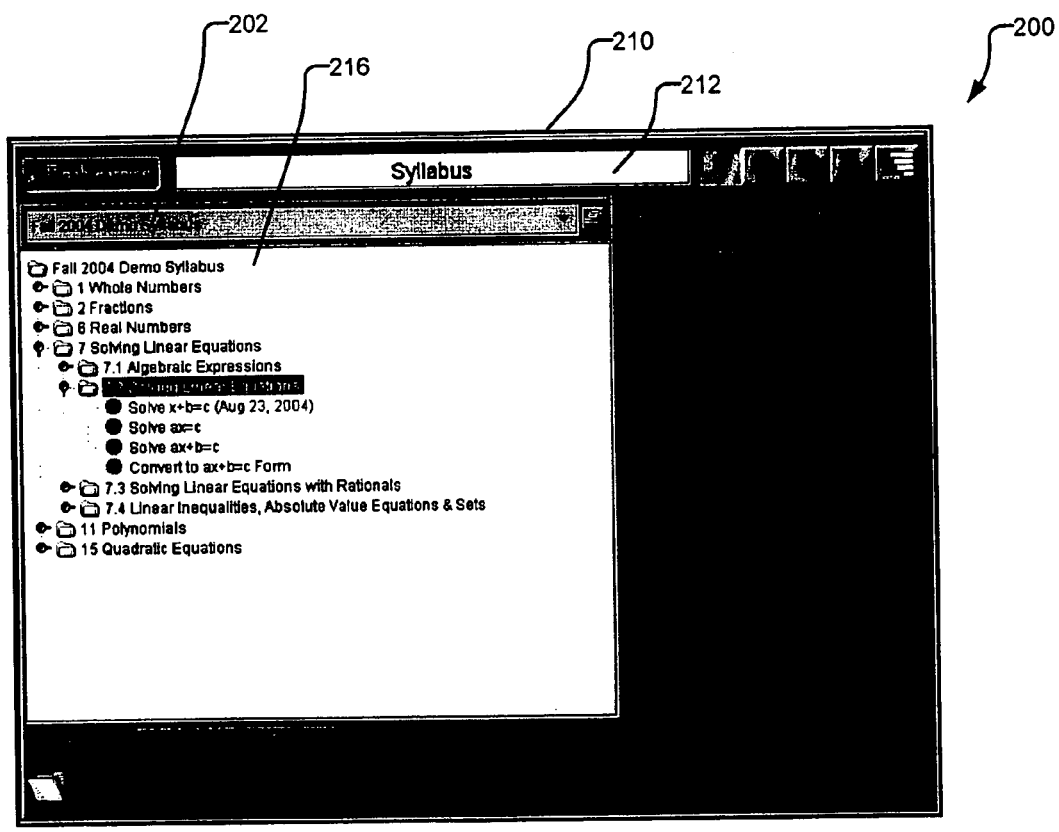
FIGS. 2A-2I illustrate exemplary interfaces (screens) for the assignment and assessment system showing problem selection and progress reporting according to the present invention.

FIG. 2A shows basic interface 200. It shows a view that would be provided to a student or teacher as they navigated through available course material in the syllabi store 116. Here, window 210 is generated by an applet, such as a Java applet. The window includes a title bar 212, which generally identifies the system. The window 210 has a navigation pane 216. The navigation pane 216 has the table of contents for a "Demo Syllabus", which is selected via drop-down menu at tab 202. Other syllabi can be selected from the drop down menu at the student or teacher discretion for other courses or for review lessons.

Figure 2B:
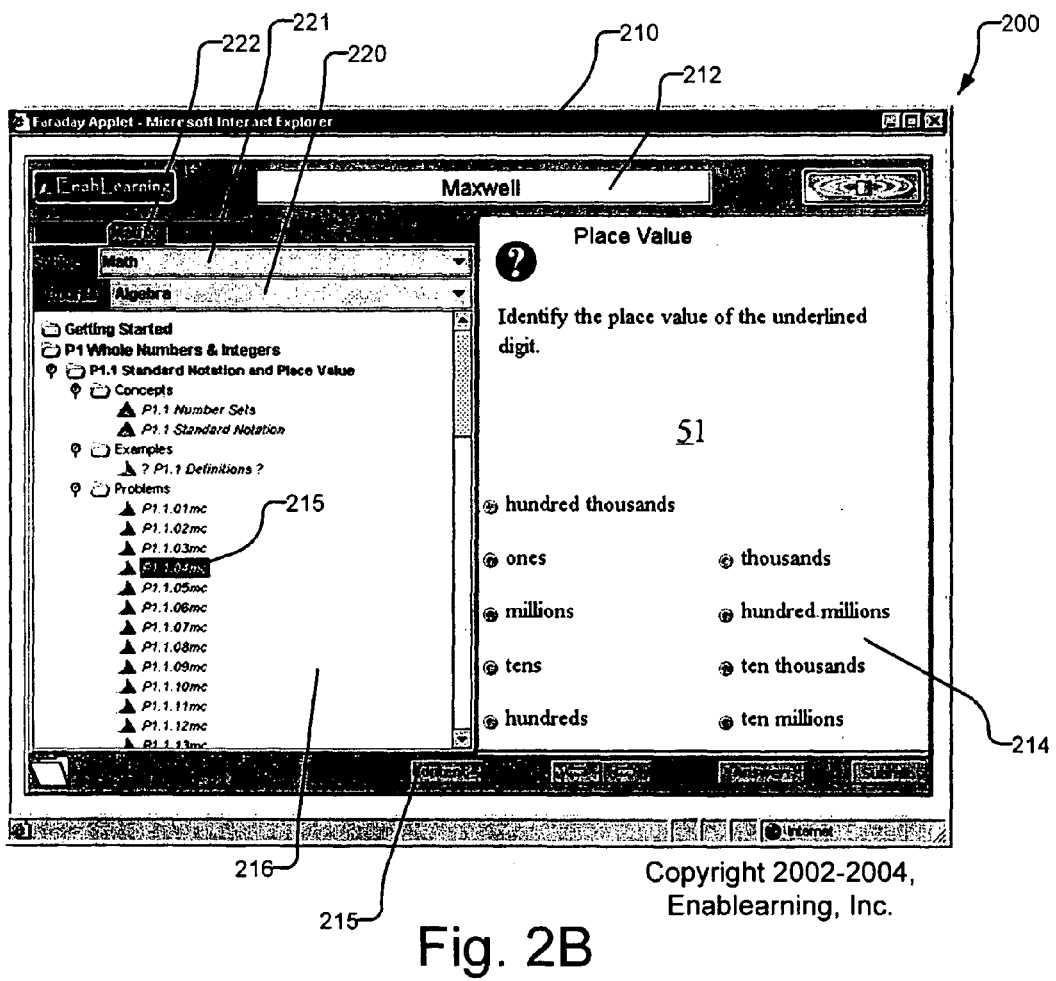

FIG. 2B shows another portion of the interface 200, which is accessed by selection of the matrix tab 222, which is selected to display the contents of and navigate through the problem library 110. The window 210 is further divided into a problem pane 214 and the navigation pane 216. The navigation pane 216 (the left side of the window) has the table of contents for the subject that can include concept presentations, examples presentations, exercises or problems, tests, links, or contextual presentations. The problems may be of different types designated by different folders.

Specifically, the problem pane 214 presents the graphical information that defines the problem to the student or user.

In the example, the problem pane 214 in FIG. 2B asks the user or student to "identify the place value of the underlined digit". A set of user selectable answers ("multiple choice") are provided. This way, the user, by selecting one of the answers, can provide an answer to this problem. Other types of problems including production ("fill-in-the-blank"), essay questions, or "select a point" type questions can also be used.

The navigation pane 216 illustrates the location of the problem in the hierarchy of database 110 and in the context of the general subject and the specific course as stored in the library 110. Specifically, in the illustrated embodiment, the subject is illustrated in the subject line 221 and the course is provided in the course line 220. The navigation pane 216 further provides, in an outline form, the problems location in the math subject and the algebra course. In this way, the teacher user is able to review available published problems by subject matter. Specifically, selecting problem 215 results in the display of that problem in the problem pane 214. These problems are then typically used as a foundation or content for the teacher's course syllabus.

Figure 2C:
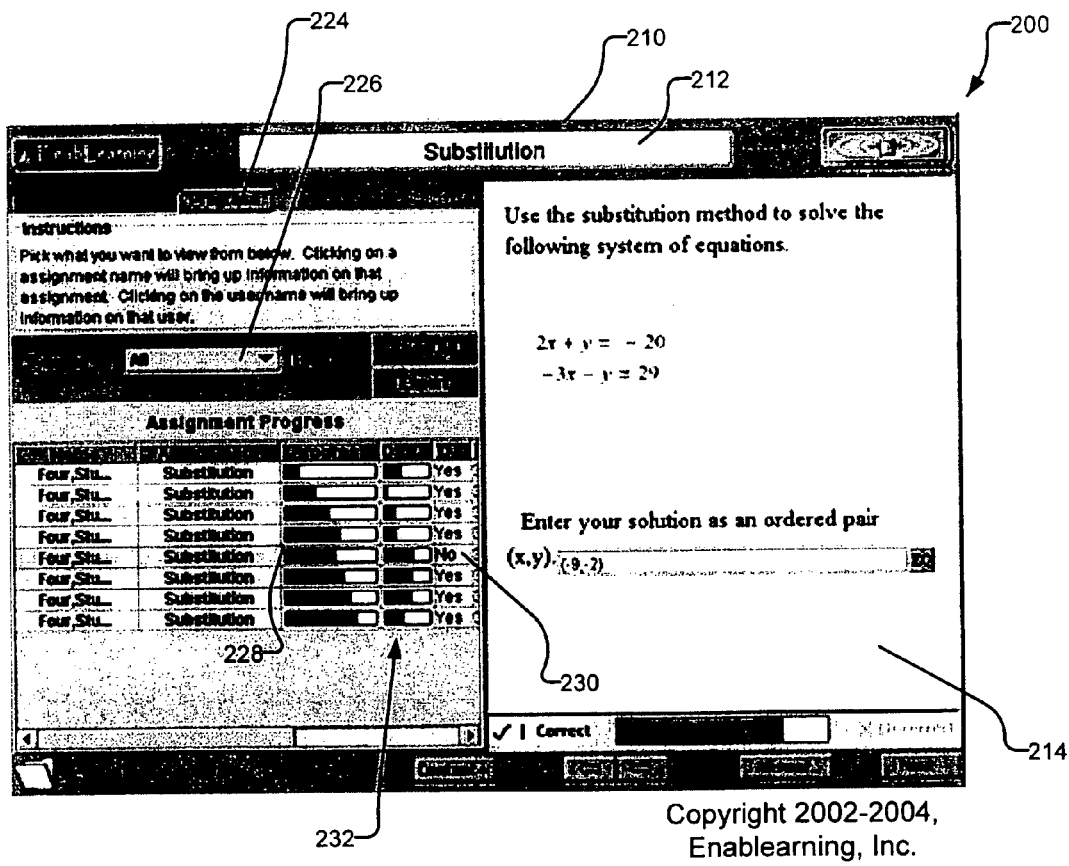

FIG. 2C shows further aspects of the user interface 200 in which teachers are able to track their students' progress toward mastery through an assignment. Specifically, again the problem is supplied in the problem pane 214. The progress navigation pane is shown by selection of the progress tab 224. The syllabus information is provided; the filter tab 226 is selected to all. Thus, an assigned problem for student is shown for an assignment, "Substitution".

This view illustrates how the students' progress is shown as he or she advances through the assignment. Specifically, the progress levels either remain static, increase, or decrease between successive problems. For example, answering problem 228 showed no advancement in progress, in fact, a moderate decrease in progress was registered because of the incorrect answer illustrated by block 230. Otherwise, the other correct answers exhibited a corresponding increase in the student's progress due to their being answered correctly.

It should be noted that the progress and difficulty tracks for each student will be unique since the problem assignment has an element of randomness build in and thus the progress and problems are unique for each student.

Further, column 232 shows the corresponding difficulty levels of the assigned problems. The assigned problems show the random nature of the difficulty levels of the assigned problems. In this case, problem that was incorrect was at the highest level of difficulty in the set, but that need not be the case in real classroom situations where students miss problems for a variety of reasons that may or may not have to so with their difficulty level.

Figure 2D:
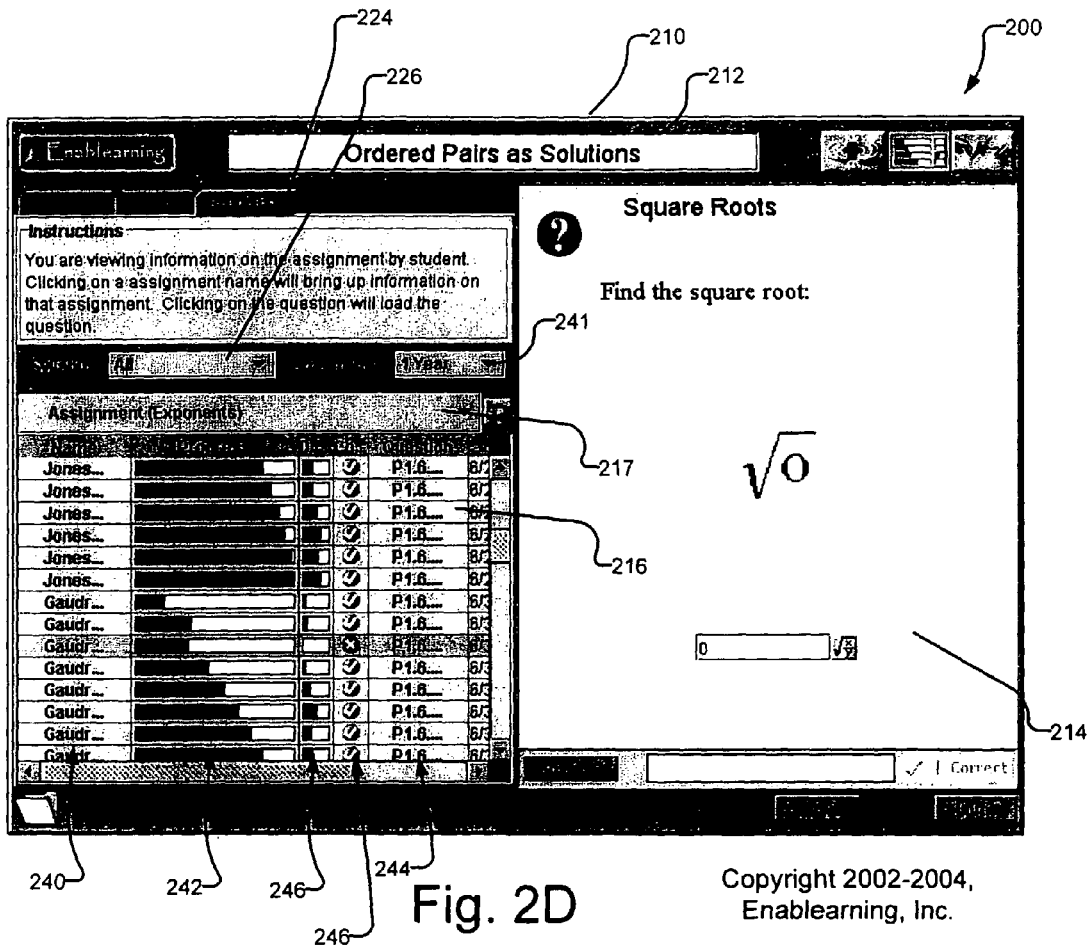

FIG. 2D displays information on assignments by student in another view in the progress screen 216. Selecting an assignment name in tab 217 will bring information on that assignment. Clicking on a question in column 244 will load the question into the problem pane 214. Typically, for each student identified in the column 240, there is an associated progress level 242. The question or problem is specified in column 244. Again, whether the student answers the problem correctly, or not, is indicated in column 246. Tab 241 allows the user to select a time frame over which information is displayed.

Figure 2E:
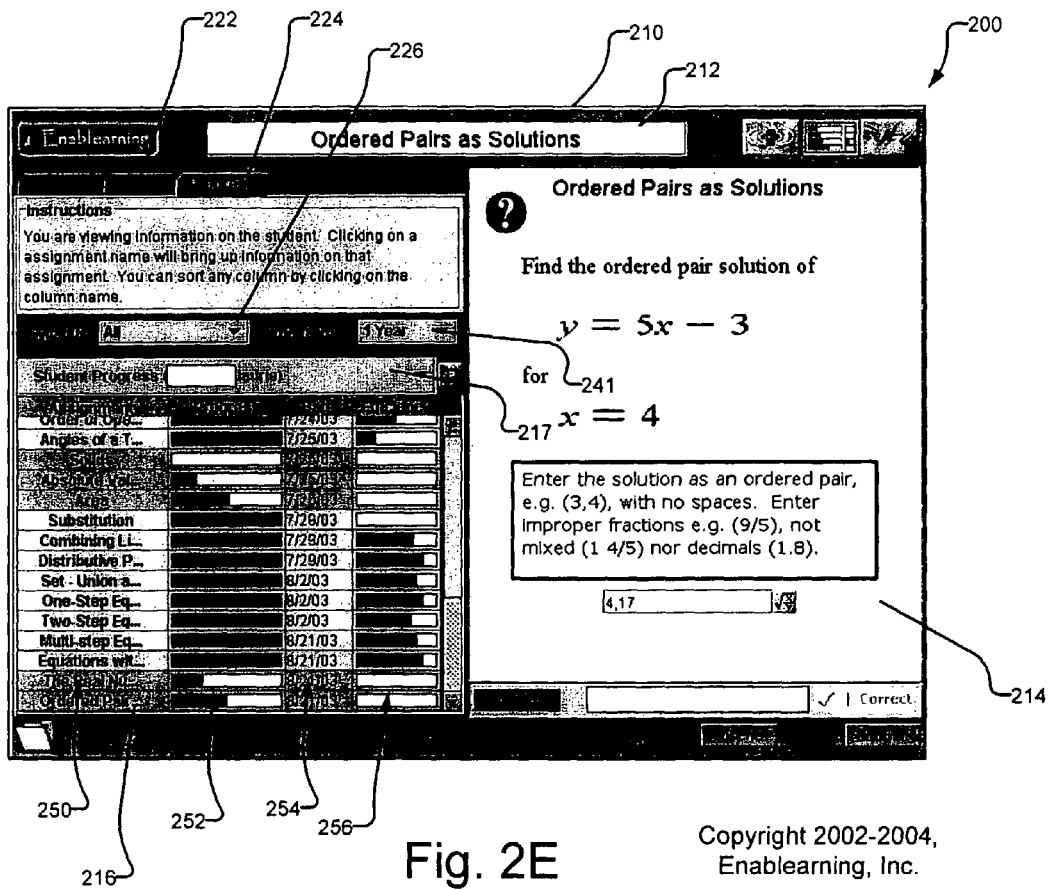

Referring to FIG. 2E, selection of assignment information in the navigation pane 216 for a specific student ["Laurie"] is shown. This information is obtained by selection of "Student Progress" information for the desired student in tab 217. Specifically, the student's progress through each assignment, identified in column 250 is provided in column 252. The date when the student last worked on the assignment is provided in column 254. Finally, the student's efficiency level is provided in column 256 on a per assignment basis. This allows the instructor to determine in what topics the student learned easily and the topics that student had more difficulty with. In the typical embodiment the student progress bars and efficiency bars are different colors and assignments completed to mastery are colored differently from assignments students have not yet completed to make them easy to distinguish.

Figure 2F:
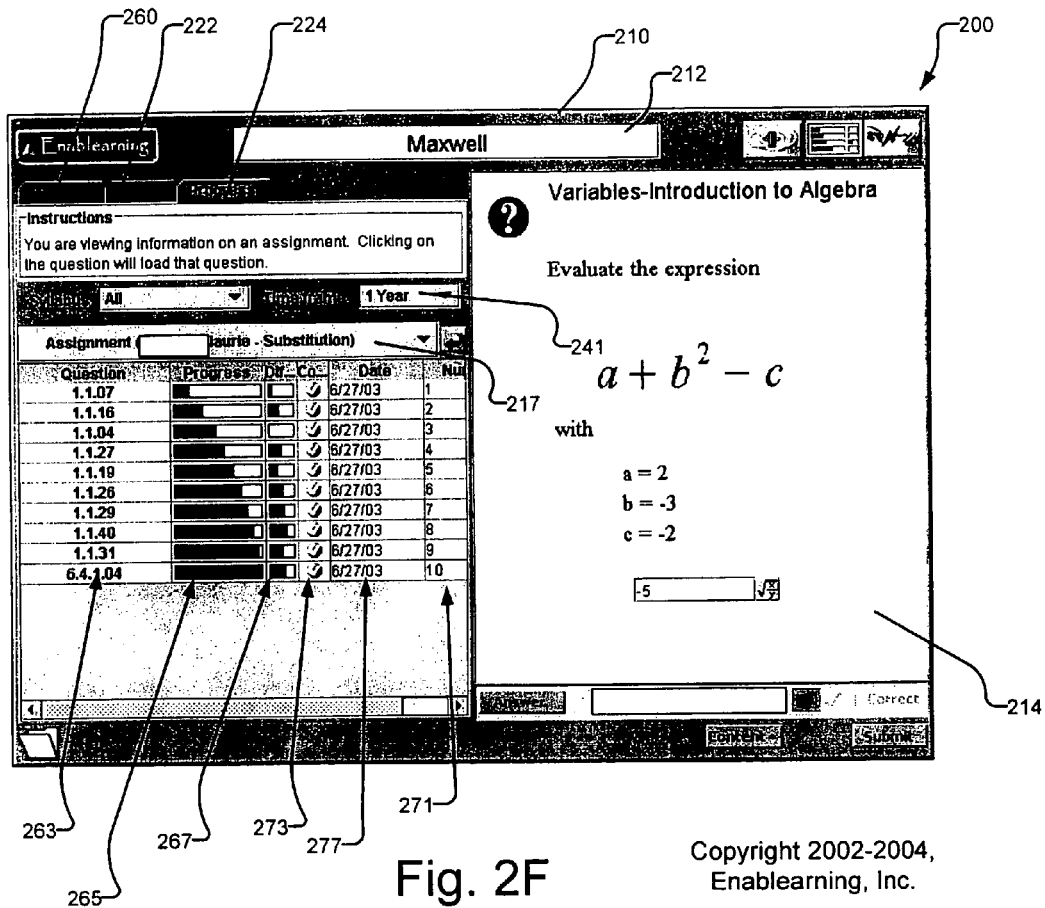

FIG. 2F illustrates another possible view under the progress tab 224. By selecting a specific assignment for a specific student using tab 217, specific questions are presented in column 263 for that student. Further, the student's progress through the assignment is monitored in column 265, along with the problem's particular difficulty levels in column 267 Whether the student answered the problems correctly or not is provided in column 273. Finally, the date when the problem was answered is provided in column 277. The problem number is provided in column 271. The view of the student data can be changed by the teacher easily, in this case by dragging the columns, and can be sorted by any of the columns or fields of this database as desired.

Figure 2G:
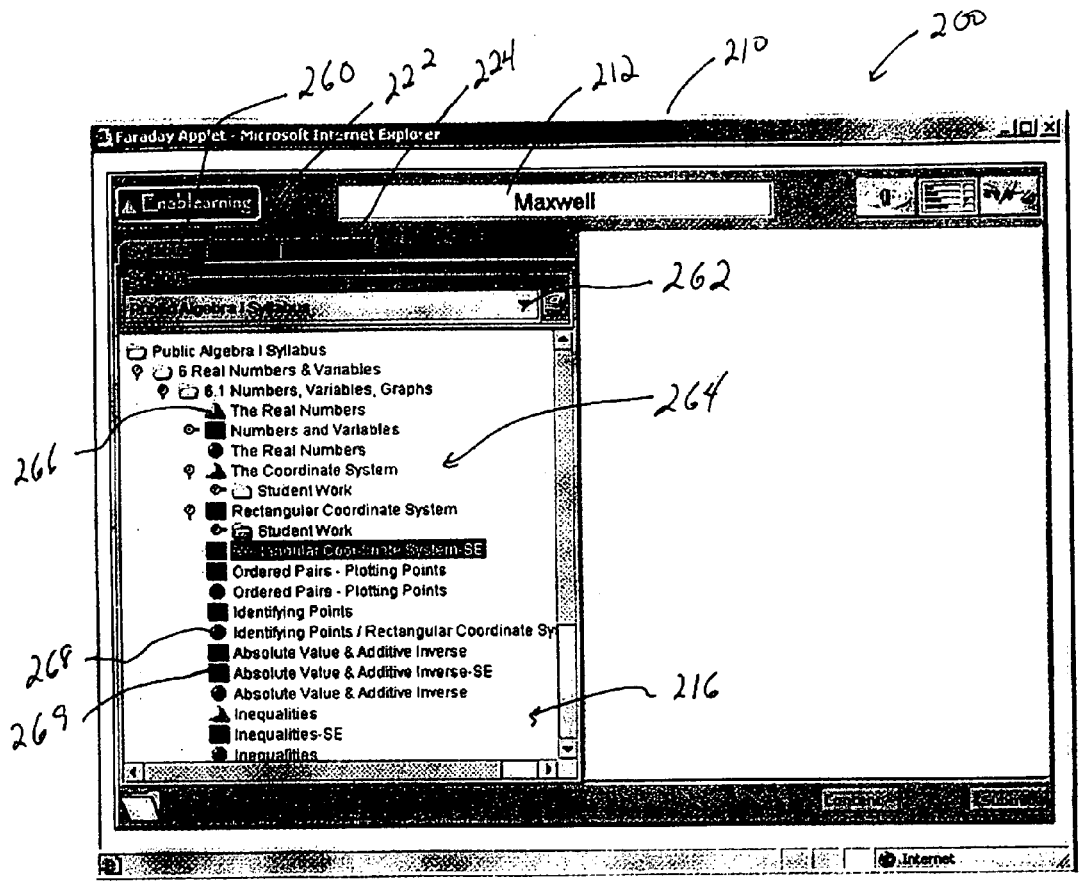

FIG. 2G illustrates selection of the syllabus view by selection of the syllabus tab 260. A specific syllabus is selected using tab 262. Then in the navigation pane 216, the outline 264 of the syllabus is provided. In the convention of the current interface, blue triangle icons 266 represent concepts for the student to learn, green circle icons 268 represent problems for the student to work on and answer, and red square icons 269 represent examples of problems that illustrate the concepts, to enable students and teachers to quickly choose what they want to look at or work on.

Figure 2H:
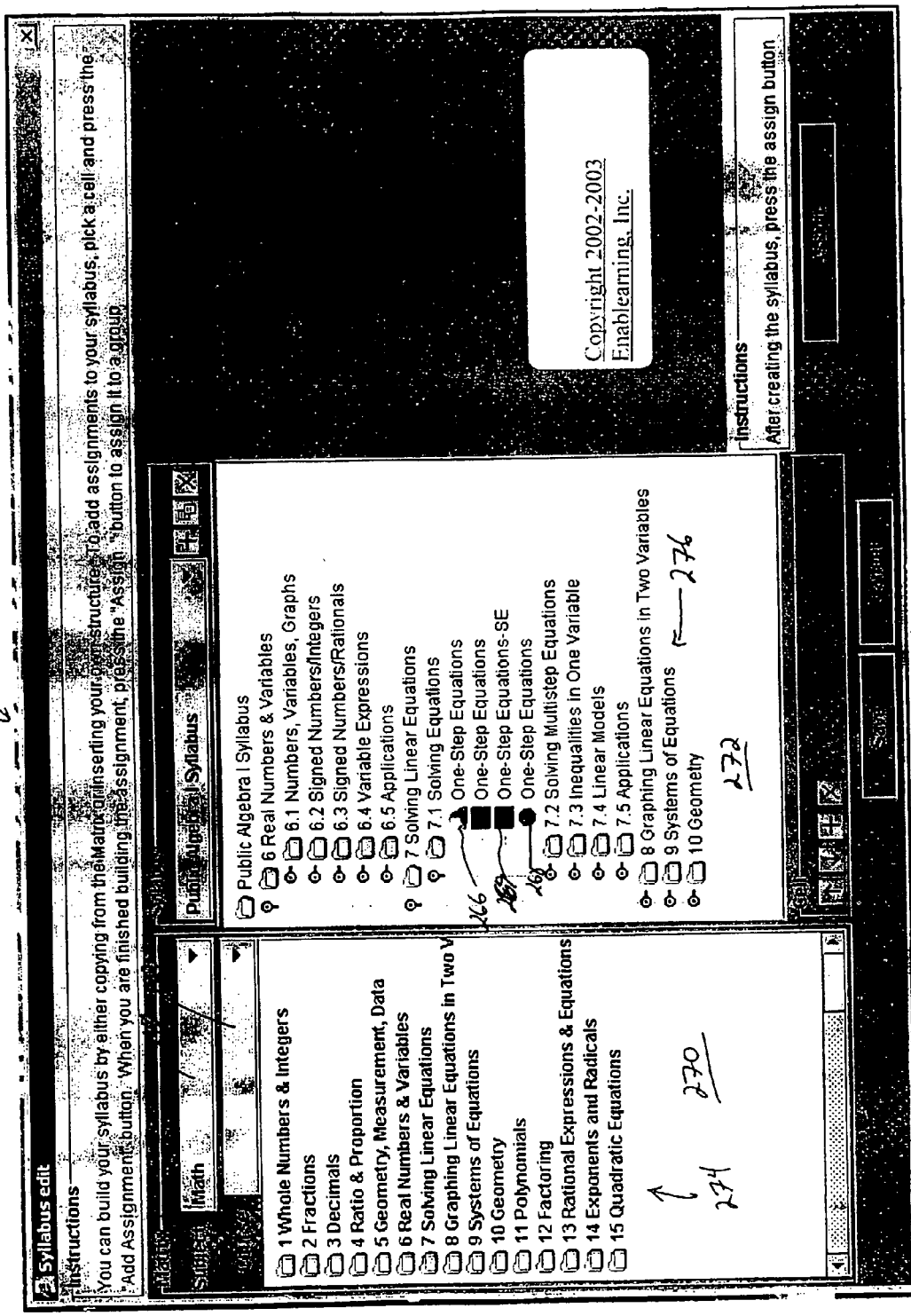

FIG. 2H illustrates the tool for teachers to construct syllabi in the interface 200. Specifically, pane 270 shows the content in the matrix or problem library 110 or "Table of Contents". Subject tab 218 enables subject level navigation in the problem library 110, course tab 220 enables course-level navigation within the library. Pane 272 shows the general structure of the syllabus under construction. New content, including concepts, problems and examples from the matrix content, is added to the syllabus by dragging and dropping or cut and paste the desired material from the content outline 274 into the syllabus outline 276 at the desired location. A teacher can change the names, titles, or headings for each portion of the syllabus and can associate completion dates for each assignment.

Figure 2I:
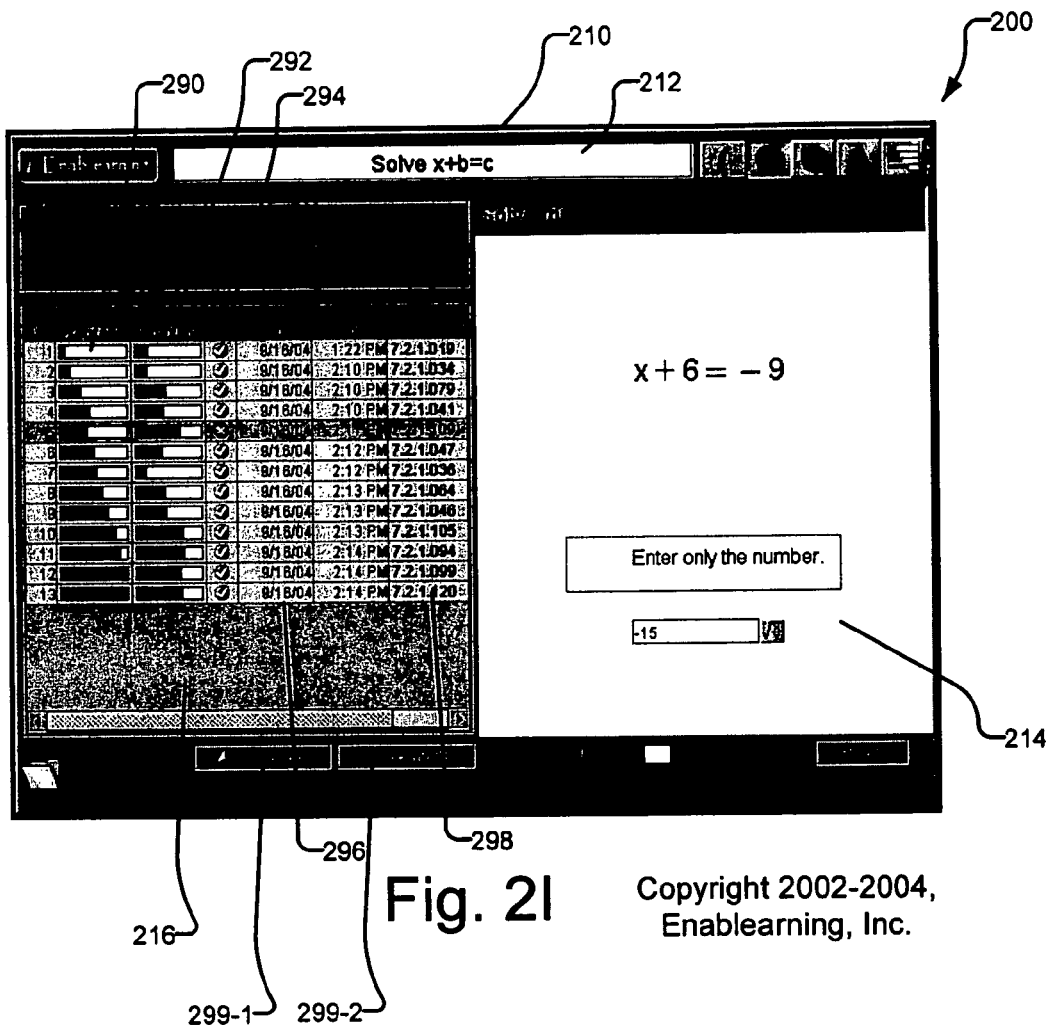

FIG. 2I illustrates a view typically presented to students. Column 290 indicates the student's progress problem-by-problem through the assignment. Column 292 shows the assigned problems' difficulty. Column 294 indicates whether the problem was correctly answered. Column 296 indicates the date and time on which the problem was answered. Column 298 identifies the problem in the library 110.

The problem that the student is currently working on, i.e., assigned by the assignment server is presented in pane 214. Upon answering the problem, the navigation pane 216 is updated.

Figure 3:
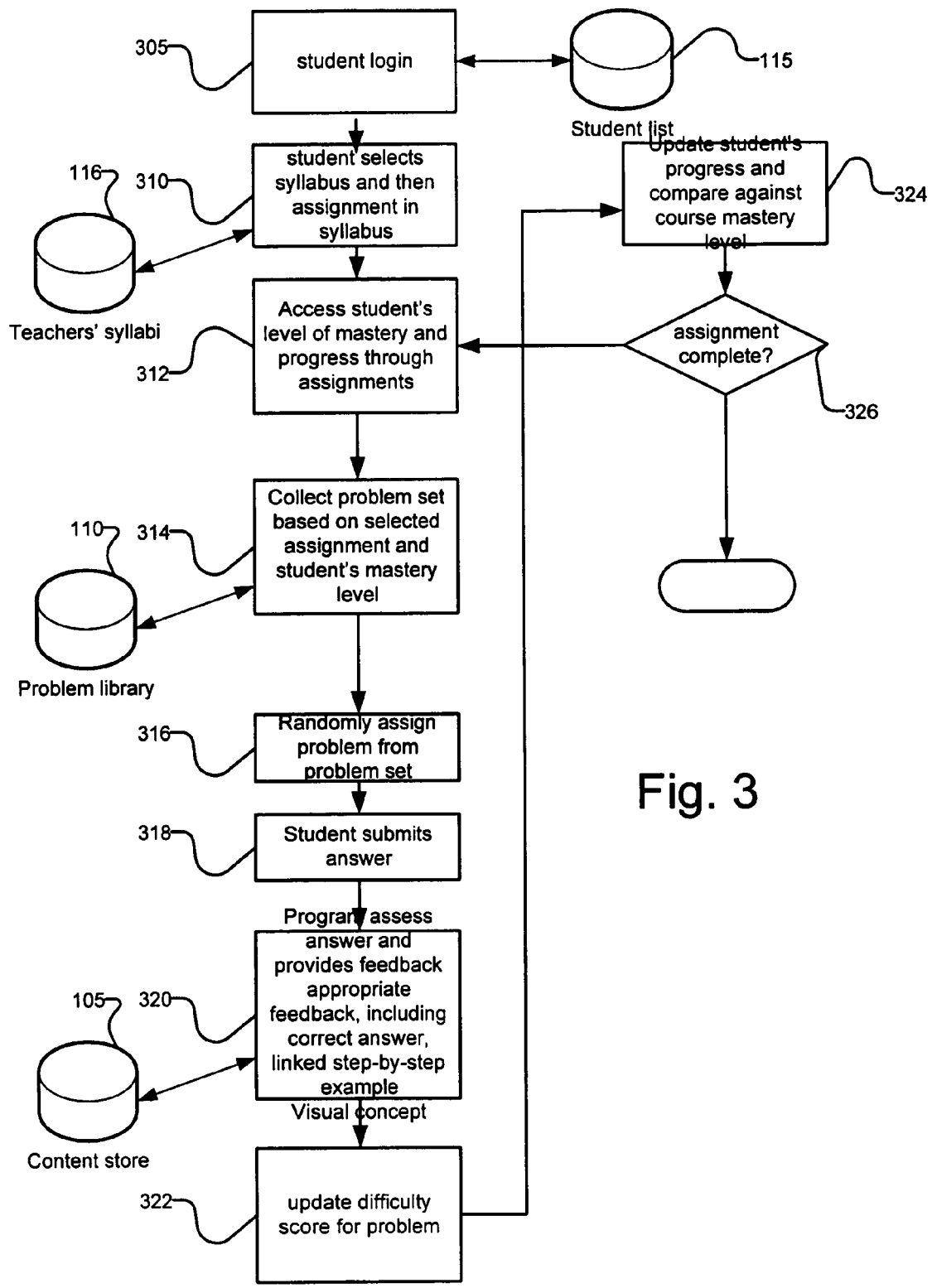
FIG. 3 is a flow diagram illustrating the process of problem assignment and result processing according to the present invention.

FIG. 3 is a flow diagram illustrating student access to the computer-based teaching method, according to the present invention. In step 305, the student logs-in. The system assesses the student list 115 to confirm the user name and password.

In step 310, the student selects an assignment problem set from the syllabus 116. This is illustrated in FIG. 2A.

Next, in response to this selection, the assignment server 105 compiles a problem set, based upon the selected assignment and the student's progress level. Specifically, the assignment server first acquires the particular student's progress level from the student list 115 in step 312, and then gets problems of appropriate difficulty levels from the problem library 110 in step 314. As discussed previously, problems are acquired that have a range in the level of difficulty from which one is chosen at random to maximize the potential rate of student progress.

Then, the assignment server 105 picks a problem at random from this set in step 316. Again, the problems are sent from the problem server 105 and graphically displayed on a client computer to the student by the student client side process 136 as illustrated in the example of FIG. 2I. The student looks at the problem and associated answer options and submits an answer in step 318. The student can also press the concepts or examples buttons (see 299-1, 299-2 in FIG. 2I) and go to the relevant content in the syllabus for some help in solving the problem. The student could go to a previous problem but cannot change the answer. Students cannot skip problems, if they do not answer a problem it will be marked wrong, because each new problem is chosen adaptively based on the students previous work.

The assignment server 105 receives the student answer and assesses the result in step 320. Specifically, the assignment server 105 compares the student answer to the answer to the problems provided in the problem library 110. This comparison is done in a number of ways that enable the problem's author to set the way the answer is to be evaluated. For example, the author may require an exact match to the answer, an algorithmic match in which the author's solution and the student's solution have the same value when tried with some possible solutions, and other evaluation techniques for checking answers.

The system also provides appropriate feedback to the student, indicating whether the problem was correctly answered and providing links to additional content relevant to understanding the problem by reference to a content store 105, such as a database or the Internet.

The assignment server then updates the difficulty level for the problem 322 as well as the problem quality in the problem library 110. Then, in step 324, the assignment server 105 updates the student's progress level and also learning efficiency in the student database 115. The progress is also compared against the course's assigned mastery level to determine whether the student has finished.

Finally, in step 326, the assignment server determines whether or not the assignment is complete. If it is not complete, then it returns to assign the next problem to the student. If the student has reached mastery, the program tells the student that he or she has reached mastery. It then gives the student the choice to do more problems for additional practice, with the student being able to set the level of difficulty of those new problems, or the student can go onto a new assignment.

FIG. 4 illustrates the general process performed by the instructor or person assigned to define the problems for the server. Specifically, the instructor first logs-in in step 405.

The instructor can then define or input problems into the system in step 410. Further, a seed level of difficulty is assigned to the problem in step 412. This seed level is generally set as easy—0.25, medium—0.5, hard—0.75. Alternatively, the author can assign a difficulty level based on their expectation of how easy this problem would be for his or her own students and compare the results to actual practice. Then the assignment server receives feedback from the student performance relative the problem and the student's mastery level, and updates the difficulty level of the problem in step 414. The stored difficulty level is then updated in step 416. This cycle repeats itself every time a student does this particular problem.

FIG. 5 illustrates the general process performed by the class instructor when reviewing class and student progress.

Specifically, the instructor first logs-in in step 405. The instructor can edit or create new syllabi for existing or new classes in step 510 using the interface as shown in FIG. 2H. In step 512, the instructor can review class progress as illustrated in FIGS. 2C-2E or individual progress in step 514 as illustrated in FIG. 2F. The teacher may also define or input problems into the system in step 410 as described above.

While this invention has been particularly shown and described with references to preferred embodiments thereof, it will be understood by those skilled in the art that various changes in form and details may be made therein without departing from the scope of the invention encompassed by the appended claims.

What is claimed is:

1. A computer-based education system, comprising:
  a problem library that stores problems and corresponding difficulty levels;
  a teacher syllabi store for storing syllabi for different courses each one of the syllabi containing references to problems in the problem library and content related to the subject matter of the problems;
  a student list that stores progress levels of students;
  an assignment server that provides the problems to the students based on the progress levels for the students and the difficulty levels of the problems, and updates the difficulty levels of the problems and progress levels of the students in response to answers to the problems that are supplied by the students.

2. A system as claimed in claim 1, wherein the assignment server provides the problems randomly from a range of difficulty levels around a difficulty level corresponding to the progress level of a student.

3. A system as claimed in claim 1, further comprising syllabi comprising teacher set student mastery levels.

4. A system as claimed in claim 1, wherein the problem library stores qualitative categories of the problem by subject matter.

5. A system as claimed in claim 1, wherein the student list stores student efficiency scores for the students that are based on the number of problems it takes for a student to reach mastery.

6. A system as claimed in claim 1, wherein the problem library stores problem quality scores for the problems that are based on how well the problems differentiate between students who know a concept and do not know a concept.

7. A computer-based teaching method, comprising:
  enabling, via a computer, students to navigate through course syllabi and assignments in each one of the syllabi, in which each one of the syllabi include information describing concepts being taught and problems illustrating the concepts;
  providing, via the computer, problems to students from a problem library based on a selected one of the assignments and progress levels for the students and difficulty levels of the problems;
  receiving answers from the students to the problems; and
  updating, via the computer, the difficulty levels of the problems and the progress levels of the students in response to the answers to the problems.

8. A method as claimed in claim 7, wherein the step of providing problems to the students comprising providing problems in a range of difficulty levels around a difficulty level corresponding to the progress level of the students.

9. A method as claimed in claim 7, further comprising adding new problems by assigning seed difficulty levels, which are then updated based on the answers to the problems that are supplied by the students.

10. A method as claimed in claim 7, wherein the problem library stores and assigns problems by qualitative categories.

11. A method as claimed in claim 7, further comprising storing student efficiency scores for the students that are based on their rate of progress or the percentage of problems they required to reach mastery.

12. A method as claimed in claim 7, wherein the problem library stores problem quality scores for the problems that are based on the ability of a problem to differentiate between strong and weak students and thus measures the value of the problem as a test question.

13. A computer-based teaching method, comprising:
  enabling, via a computer, students to navigate through course syllabi and assignments in each one of the syllabi, in which each one of the syllabi include information describing concepts being taught and problems illustrating the concepts, and enabling the students to select assignments;
  collecting, via the computer, problems from a problem library into individual problem sets for each one of the students in response to the selection of the assignments by the students, the problems being selected for each problem set based on a selected one of the assignments, progress levels for the respective students that selected the assignments, and difficulty levels of each of the problems;

presenting the problems of the problem sets to the respective students;

receiving student answers from the students to the problems;

indicating to the students whether the student answers matched problem answers to the problems by providing correct answers to the problems before presenting further problems of the selected assignment;

updating, via the computer, the difficulty levels of the problems and the progress levels of the students in response to the student answers to the problems.

14. A method as claimed in claim 13, further comprising indicating after receiving each of the student answers whether the student answers match the problem answers.

15. A method as claimed in claim 13, further comprising providing access to additional content relevant to each of the problems and the problem answers.

16. A method as claimed in claim 13, further comprising reporting to an instructor for the students regarding the progress levels of the students in answering the problems.

17. A method as claimed in claim 16, wherein the step of reporting includes generating a display of information relative to a student comprising a list of assignments for the student and an indication of the progress levels of the student in each of the assignments.

18. A method as claimed in claim 17, wherein the display of information further includes a date and time when the student last worked on the assignment.

19. A method as claimed in claim 18, wherein the display of information further includes a measure of an efficiency with which the student correctly answered problems in each of the assignments and a number of problems required by the students to reach mastery.

20. A method as claimed in claim 16, wherein the step of reporting includes generating a display of information relative to a student comprising a list of questions presented to a student in an assignment, a date and time when the questions were answered, and an indication of the progress level of the student through the assignment.

21. A method as claimed in claim 13, wherein the step of providing problems to the students comprising providing problems in a range of difficulty levels around a difficulty level corresponding to the progress level of the students.

22. A method as claimed in claim 13, wherein the problems are selected as the student does the selected assignment based on the progress through the selected assignment.

* * * * *